United States Patent
Rudolph et al.

(10) Patent No.: US 7,017,972 B2
(45) Date of Patent: Mar. 28, 2006

(54) MOTOR VEHICLE WHICH CAN BE CONVERTED FROM A PICK-UP INTO A CONVERTIBLE

(75) Inventors: Thomas Rudolph, Hechendorf (DE); Michael Kölbl, Neuried (DE); Peter Oberhaus, Inning (DE); Francois De Gaillard, Paris (FR); Manfred Färber, Wielenbach (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 10/866,185

(22) Filed: Jun. 14, 2004

(65) Prior Publication Data
US 2005/0017545 A1   Jan. 27, 2005

(30) Foreign Application Priority Data
Jun. 12, 2003   (DE)   ................................. 103 26 980

(51) Int. Cl.
*B60J 7/00*   (2006.01)
(52) U.S. Cl. .......................... 296/107.16; 296/107.17; 296/220.01
(58) Field of Classification Search ........... 296/107.16, 296/107.17, 220.01, 219
See application file for complete search history.

(56) References Cited

U.S. PATENT DOCUMENTS

| | | | | |
|---|---|---|---|---|
| 6,033,012 A | * | 3/2000 | Russke et al. | ............... 296/219 |
| 6,497,447 B1 | * | 12/2002 | Willard | ....................... 296/108 |
| 2004/0041437 A1 | * | 3/2004 | Willard | ....................... 296/108 |

FOREIGN PATENT DOCUMENTS

| | | |
|---|---|---|
| DE | 298 17 132 U1 | 3/2000 |
| DE | 100 28 777 A1 | 1/2002 |
| DE | 100 28 780 A1 | 1/2002 |

* cited by examiner

*Primary Examiner*—Dennis H. Pedder
(74) *Attorney, Agent, or Firm*—David S. Safran

(57) ABSTRACT

A motor vehicle is provided which includes a passenger compartment, a vehicle roof which in its closed position closes the passenger compartment, and a cargo bed open to the top and located behind the passenger compartment. The vehicle roof can be swiveled from its closed position into an open position in which its rear edge is located behind the passenger compartment near the cargo bed. A multiple-joint arrangement is provided for swiveling the motor vehicle roof out of the closed position into the open position and thus allowing the vehicle to be easily converted from a pick-up into a convertible. The multiple-joint arrangement includes a first part attached to the roof at or near the rear edge of the roof and a second part attached to a middle area of the roof.

8 Claims, 2 Drawing Sheets

MOTOR VEHICLE WHICH CAN BE CONVERTED FROM A PICK-UP INTO A CONVERTIBLE

BACKGROUND OF THE INVENTION

1. Field of the Invention

The invention relates to a motor vehicle with a passenger compartment, a vehicle roof which in its closed position closes the passenger compartment, and a cargo bed which is open to the top and which is located behind the passenger compartment.

2. Description of Related Art

Motor vehicles having a passenger compartment, a roof closing the passenger compartment and a cargo bed located behind the passenger compartment, often referred to as pick-ups, are becoming increasingly popular since they can be used in a versatile manner and are well suited especially for the transport of articles. On the other hand, convertibles are also becoming increasingly popular.

Published German patent application 100 28 780 A1 discloses a station wagon which can be converted into a pickup. To do this, the side windows, which are located behind the C pillar, and the back window are lowered, and the roof element covering these windows is pushed forward over or under the fixed roof which is located in front of this roof element. By moving the back window together with the frame which guides it forward and moving the back window up, the passenger compartment is closed to the rear, and the conversion of the station wagon into a pick-up is complete.

Published German patent application 100 28 777 A1 likewise discloses a station wagon which can be converted into a pick-up. To do this, the side windows, which are located behind the C pillar, and the back window are lowered. The roof element, covering these windows, is securely joined to two D pillars, to the lower ends of which one end of a respective swiveling lever is coupled. The other end of this swiveling lever is coupled to the respective side wall. The roof element together with the two D pillars is swiveled forward and slightly up so that the roof element comes to rest over the fixed roof which is located in front of this roof element and the D pillars come to rest behind the C pillars. After the back window is moved up, the passenger compartment is closed again to the rear and the conversion of the station wagon into a pack-up is completed.

Neither of the two above-described station wagons, which can be converted into a pick-up, can be converted into a convertible. German Utility Model application 298 17 132 U1, however, discloses a pick-up with a sliding roof which is divided into two roof cover parts. The roof includes a roll bar located in the rear part of the passenger compartment as a fixed body part. The roof cover parts can be pushed to the rear on top of one another into a pocket in the transverse part of the roll bar. The roll bar must have a considerable length in the lengthwise direction of the vehicle for this purpose. In this way, the panoramic view which is desired in convertibles is adversely affected to a major degree. Moreover, the roof cannot be completely removed, but the roof length can be reduced at most to the length of the roof cover parts which lie on top of one another. Thus the vehicle cannot be regarded as a genuine convertible.

There do not appear to be any known vehicles in which conversion from a pick-up into a genuine convertible and vice versa can be accomplished. Thus the automobile buyer is forced to decide in favor of one of the two aforementioned vehicle types.

SUMMARY OF THE INVENTION

The object of the present invention is to devise a pick-up which can be easily converted into a convertible and vice versa.

The above object, and other objects, are achieved by providing a vehicle roof that can be swiveled from its closed position into an open position in which its rear edge is located behind the passenger compartment near the cargo bed. The vehicle roof is attached to a first part of a multiple-joint arrangement in the area of the roof's rear edge, and attached to a second part of the multiple-joint arrangement generally in the area of the middle of the roof, for swiveling the motor vehicle roof out of the closed position into the open position. Thus the vehicle of the present invention can be easily converted from a pick-up into a convertible and vice versa. In this way, both the advantages of a pick-up and the advantages of a convertible can be combined and thus used in a single vehicle.

One especially simple construction arises when the multiple-joint arrangement is a 4-joint arrangement.

The back window can preferably be lowered and, after moving the motor vehicle roof, can be raised again, to assume the function of a spoiler when being moved open.

The motor vehicle roof can be stowed especially compactly when it is divided in the lengthwise direction of the motor vehicle into a front roof part and into a rear roof part and the front roof part can be moved over or under the rear roof part.

Preferably, the motor vehicle of the present invention has the functionality of a sliding roof in that the front roof parts can be fixed on its displacement path over or under the rear roof part in any position on the displacement path.

When the motor vehicle roof has a transparent area in the area that comes to rest after swiveling behind the rear window, the view to the rear is ensured even when the motor vehicle roof is swiveled to the rear. To enable protection from the sun for the transparent area, it is advantageous to provide an opaque cover device which can be moved under the transparent area.

DETAILED DESCRIPTION OF THE INVENTION

Figure 1:
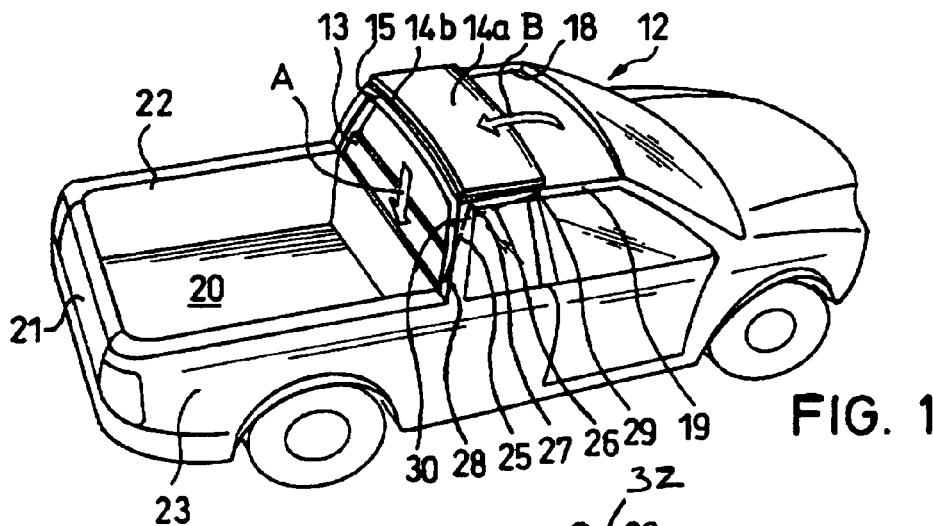
FIG. 1 shows a perspective of a first embodiment of the motor vehicle of the present invention with the back window half-lowered and the front roof part moved over the rear roof part.
Figure 2:
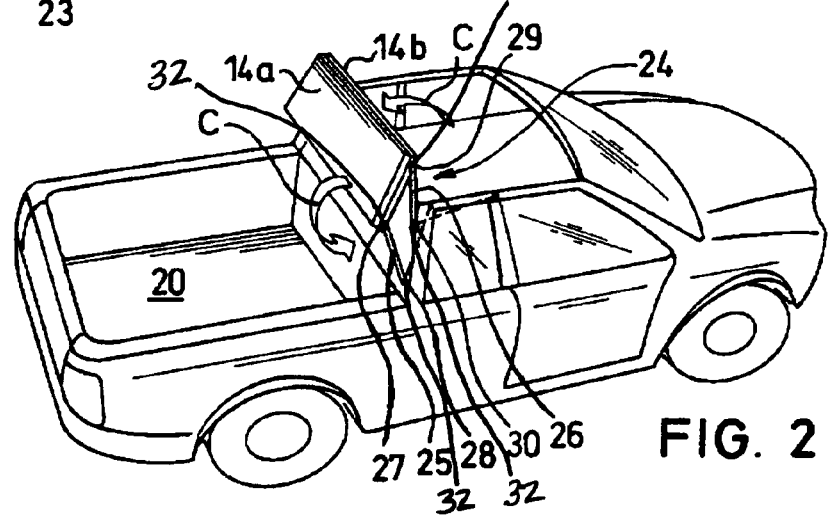
FIG. 2 shows a view similar to FIG. 1 with the motor vehicle roof swiveled halfway to the rear and down.

FIGS. 1 and 2 show a first embodiment of this invention. While FIG. 1 shows a vehicle made as a pick-up with a closed passenger compartment, FIG. 2 shows the same vehicle during conversion into a convertible (with the passenger compartment open to the top and to the rear).

The motor vehicle of the present invention has a passenger compartment 12 which comprises a motor vehicle roof 14, a left lengthwise roof member 18 and a right lengthwise roof member 19. The motor vehicle roof 14 in this embodiment—relative to the lengthwise direction of the motor vehicle—is divided into a front roof part 14a and a rear roof part 14b. The passenger compartment 12 is closed on its back by a back window 13. A cargo bed 20 which adjoins the back of the passenger compartment 12 is bordered by a left side wall 22, a right side wall 23 and a tailgate 21. To swivel the motor vehicle roof 14, there is a multiple-joint arrangement 24 with a structure and manner of operation which will be detailed later.

If at this point the pick-up is to be converted into a convertible, first the back window 13 is lowered as indicated by the arrow A in FIG. 1. Afterwards, the front roof part 14a is raised and pushed to the rear over the rear roof part 14b (compare arrow B in FIG. 1). This movability of the front roof part 14a relative to the rear roof part 14b corresponds to the normal operation of an externally guided sliding roof and is independent of the convertibility of the pick-up into a convertible. Alternatively, the front roof part 14a can also be pushed to the rear under the rear roof part 14b; this corresponds to normal operation of an internally guided sliding roof.

Next, the roof package, which consists of the front roof part 14a and the rear roof part 14b, is swiveled down and to the rear according to the arrows C in FIG. 2. The position of the roof package during this swiveling process is shown in FIG. 2. The swiveling process is carried out by the multiple-joint arrangement 24 which is made in this embodiment as a 4-joint arrangement. For the sake of clarity, only one side of this 4-joint arrangement, i.e. the side facing the viewer, is shown, but a corresponding portion of the arrangement is positioned on the other side of the vehicle. The 4-joint arrangement 24 comprises a first connecting rod 25 and a second connecting rod 26. The first end 27 of the first connecting rod 25, which is at the top in the closed position of the motor vehicle roof 14, is coupled to the motor vehicle roof 15 in the area of the rear edge 15 (that is, at or adjacent rear edge 15) of the motor vehicle roof 14 or of the rear roof part 14b. The second end 28 of the first connecting rod 25, which is located at the bottom in the closed position, is coupled on the back of the passenger compartment 12 generally at the height of the top edge of the side wall 23, therefore generally in the middle between the top edge of the motor vehicle roof 14 and the cargo bed 20. The first end 29 of the second connecting rod 26, which is at the top in the closed position, is coupled to the rear roof part 14b generally in the area of the middle of the motor vehicle roof 14, and more accurately, in the area of the front end of the rear roof part 14b. The second end 30 of the second connecting rod 26, which is located at the bottom in the closed position, is coupled only slightly underneath the first end 27 of the first connecting rod 25 on the back of the passenger compartment 12.

The motor vehicle roof, after swiveling, adjoins the back of the passenger compartment 12 (roughly parallel to the lowered back window 13) and thus occupies very little cargo volume on the cargo bed 20. The passenger compartment 12 is thus open to the top and rear, i.e. the conversion of the pick-up into a convertible is completed. The back window 13 can then be moved again, if necessary, partially or completely up in order to be used as a spoiler.

Alternatively to the above-described conversion, it is also possible for the back window 13 to remain in its position moved up with the rear or back edge 15 of the motor vehicle roof 14 being slightly raised before it is swiveled down beyond the back window 13.

As is apparent from the description above, the transformation from a pick-up into a convertible (and vice versa) takes place without difficulty by simple swiveling movements of the motor vehicle roof and optionally simple translational movements, i.e. no complicated sequences of movements of the motor vehicle roof are necessary. Of course, handling and comfort can be improved in the described transformation if this conversion takes place fully automatically, i.e. motor-driven. The motors required for this purpose are not shown. The multiple-joint arrangement 24 includes couplings, indicated generally at 32 (FIG. 2), between the ends of the rods of arrangement 24 and both the roof 14 and the passenger compartment 12 which permit sufficient swiveling of the components, such as one or more hinges.

The roof part 14a can be stopped, and optionally fixed, in any of its intermediate positions between the initial position and the end position on its displacement path over the roof part 14b. Thus it is possible to implement the functionality of a sliding roof.

Figure 3:
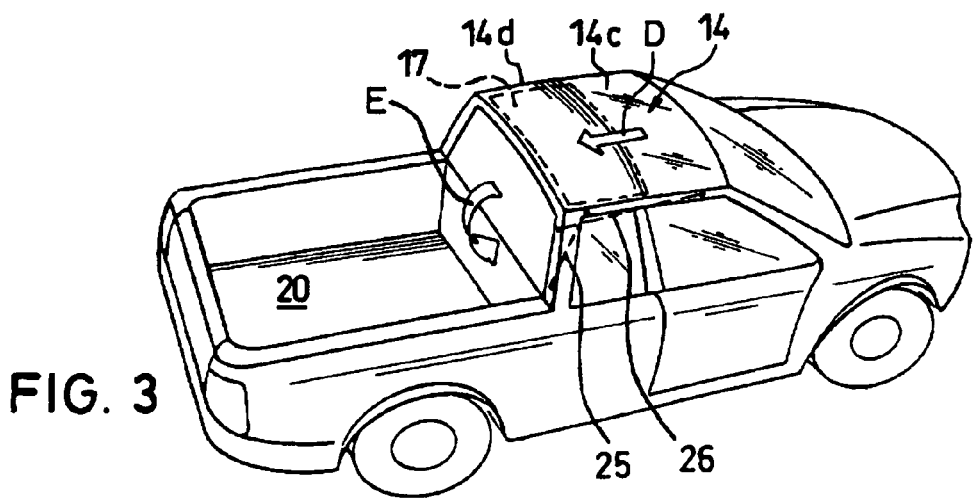
FIG. 3 shows a perspective of a second embodiment of the motor vehicle of the present invention with the vehicle roof in the closed position.
Figure 4:
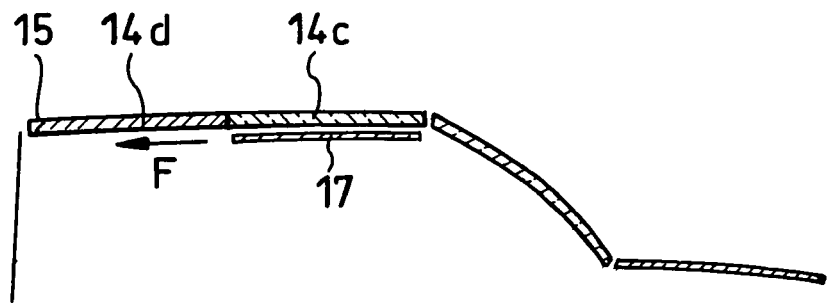
FIG. 4 shows a sectional view through the motor vehicle roof according to the second embodiment.
Figure 5:
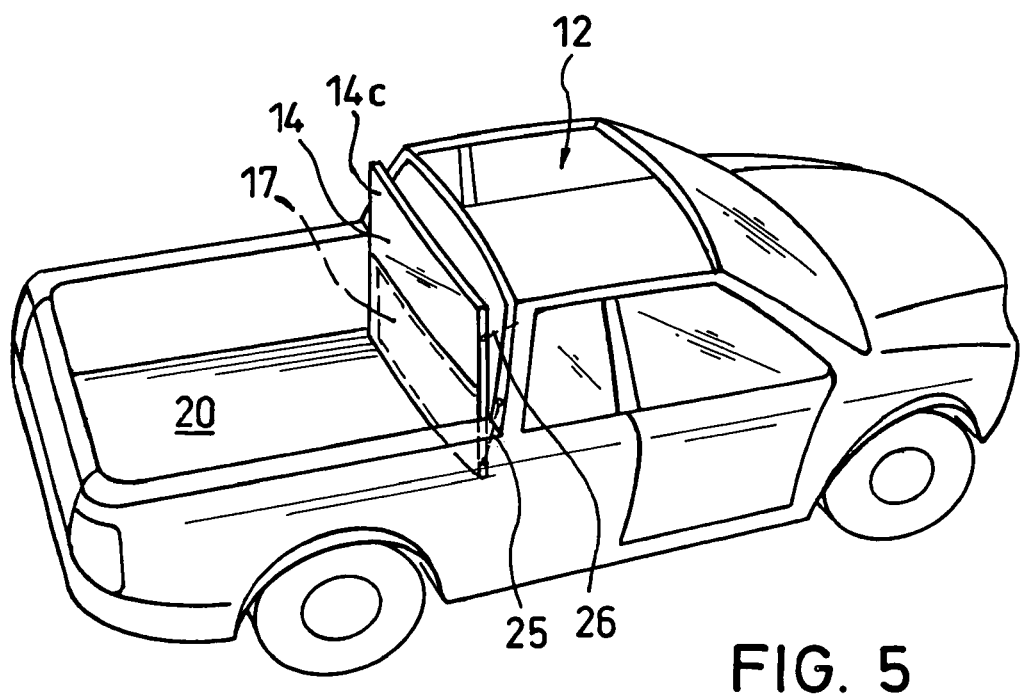
FIG. 5 shows a view similar to FIG. 3 with the motor vehicle roof swiveled completely to the rear and down behind the passenger compartment and resting vertically on the cargo bed.

In the second embodiment of the present invention as shown in FIGS. 3–5, the motor vehicle roof 14 comprises a front roof area 14c which is transparent, and a rear roof area 14d which is conventionally opaque, but which can also be transparent. Underneath the transparent front roof area 14c, there is an opaque cover device 17 for protection against the sun for the transparent roof area 14c which can be pushed under the rear roof area 14d (compare arrow D in FIG. 3 and arrow F in FIG. 4). Conventionally, the cover device 17 is a sliding head liner, but it can also be a tinted window, for example. The swiveling process of the motor vehicle roof 14 as a whole corresponding to the arrow E in FIG. 3 then corresponds generally to that in the first embodiment. In order to achieve a more favorable lever action when the motor vehicle roof 14 is being swiveled, the coupling point of the first end 29 of the second connecting rod 26 lies farther forward than in the first embodiment. FIG. 5 shows how the motor vehicle roof 14, after the swiveling process, is located generally parallel to the back window (not shown) on the back of the passenger compartment 12 on the cargo bed 20. The cover device 17 is pushed down so that the view to the rear through the back window is not obstructed by the cover device 17, but is possible through the transparent roof area 14c.

It is clear that the coupling points of the 4-joint arrangement 24 can be selected depending on the given size ratios and the required swiveling conditions. It moreover goes without saying that instead of the 4-joint arrangement 24, other joint arrangements with several joints, for example a 7-joint arrangement, can be used.

In the above description of the second embodiment, it was assumed that the front area of the motor vehicle roof is transparent. If the length of the motor vehicle roof (for example, in a 2-seat pickup) is short and the height for stowing the motor vehicle roof underneath the back window is large, or if it is not necessary to look backwards through the rear window, the motor vehicle roof 14 can be completely opaque.

We claim:

1. A motor vehicle, comprising:
    a passenger compartment;
    a cargo bed located behind the passenger compartment;
    a rear window located between the cargo bed and the passenger compartment for closing a rear side of the passenger compartment;
    a motor vehicle roof closing a top side of the passenger compartment when in a closed position, the vehicle roof being swivelable from its closed position into an open position in which a rear edge of the vehicle roof is located behind the passenger compartment near the cargo bed with the roof extending upwardly from the cargo bed behind the rear window at the rear side of the passenger compartment; and
    a multiple-joint arrangement adapted to permit swiveling of the motor vehicle roof out of the closed position into the open position, the multiple-joint arrangement including a first part attached to the roof at least adjacent the rear edge and a second part attached to a middle area of the vehicle roof.

2. The motor vehicle of claim 1, wherein the multiple-joint arrangement is a 4-joint arrangement.

3. The motor vehicle of claim 1, wherein the passenger compartment comprises a lowerable back window, the back window being lowerable with the roof in said closed position.

4. The motor vehicle of claim 1, wherein the vehicle roof is divided in the lengthwise direction of the vehicle into a front roof part and into a rear roof part, the front roof part being moveable relative to the rear roof part into a stacked configuration in which one of the roof parts is located above the other of the roof parts.

5. The motor vehicle of claim 4, wherein the front roof part can be stopped in any position along a displacement path from the closed position into said stacked configuration.

6. The motor vehicle of claim 1, wherein the motor vehicle roof includes a front roof area which is transparent and a rear roof area.

7. The motor vehicle of claim 6, further including an opaque cover device positioned underneath the front roof area, the opaque cover device being moveable under the rear roof area.

8. A motor vehicle, comprising:
    a passenger compartment;
    an approximately vertical rear window for closing an upper portion of a rear end of the passenger compartment;
    a substantially horizontal motor vehicle roof adjoining the rear window at an upper rear corner thereof and closing the passenger compartment from above when in a closed position, said roof being comprised of a plurality of displaceable panels; and
    a joint mechanism for producing a substantially horizontal relative displacement of the panels into a stacked configuration, one above the other over the rear end of the passenger compartment in a first opening movement for exposing a front portion of the passenger compartment, and for producing a swiveling movement of said stacked configuration from a substantially horizontal orientation to the approximately vertical orientation of the rear window.

* * * * *